Oct. 25, 1955    N. F. ANDREWS    2,721,431
SNAPPING ROLL CONTROL CONNECTION TO
CLUTCH OF MOUNTING TRACTOR
Filed April 5, 1952    2 Sheets-Sheet 1

INVENTOR.
N. F. Andrews
BY
Attorneys

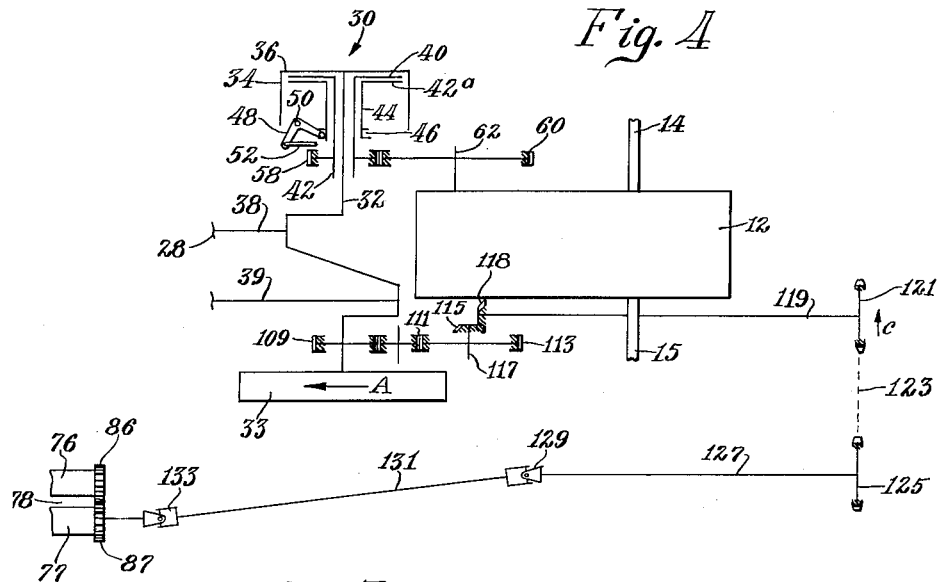
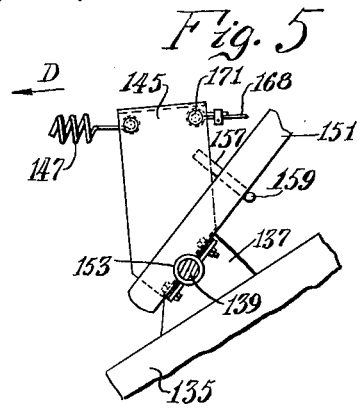
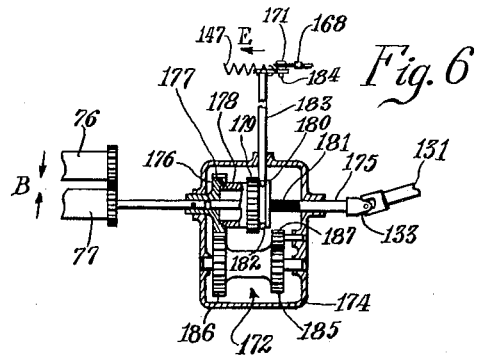
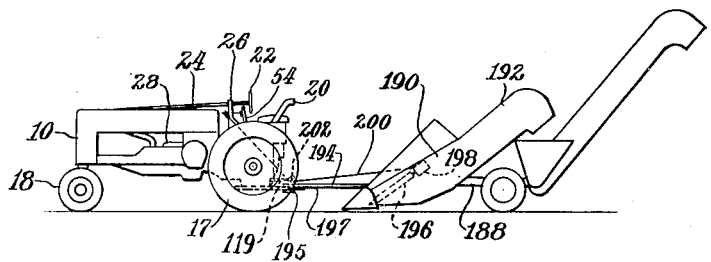

United States Patent Office 2,721,431
Patented Oct. 25, 1955

2,721,431

SNAPPING ROLL CONTROL CONNECTION TO CLUTCH OF MOUNTING TRACTOR

Norman F. Andrews, Ankeny, Iowa, assignor to Deere Manufacturing Co., Dubuque, Iowa, a corporation of Iowa Application April 5, 1952, Serial No. 280,823

17 Claims. (Cl. 56—18)

This invention relates to driving and crop-handling means for an agricultural machine. More particularly, the invention relates to the coordination of the drive and control of the harvesting mechanism in respect of the power train utilized to drive the machine and its parts.

A typical agricultural machine in which the invention will find its greatest utility is the mobile corn picker. In one form of corn picker, the machine is provided as a unit comprising a tractor or other self-propelled vehicle on which one or more corn-picking units is mounted. The machine may also be provided in the form of a propelling vehicle, such as a tractor, which tows a corn picker having one or more gathering units. In either case, the problems are substantially the same.

The conventional corn picker gathering unit comprises a pair of rotatable members such as snapping rolls which between them define a crop-receiving space. As the machine advances over the field, the standing stalks are received in this space and the rolls, which rotate downwardly and away from each other, pinch off or snap the ears from the stalks. In a particularly heavy stand of corn, the quantity of stalks and ears presented to the rollers may exceed that which the rolls have capacity to handle, with the result that the gathering mechanism becomes clogged and must be cleared before the machine can continue. In ordinary practice, the operator will stop the machine, dismount from the seat and attempt manually to alleviate the clogged condition. Since it is difficult to withdraw the clogged and jammed stalks with the snapping rolls idle, the operator has a more or less natural tendency to reconnect the drive to the snapping rolls to aid in clearing them. However, this is an extremely dangerous practice and many operators have been seriously injured.

There are several fundamental characteristics of the conventional agricultural tractor that seem to contribute materially to the danger described above, but the major factor is the ability to continue operation of the tractor power take-off means even though the tractor is idle. In the majority of tractors, the power take-off means is connected into the power train in series with the tractor transmission, so that when the main engine clutch is disengaged the power take-off means will stop, but the operator will shift the transmission into neutral and reengage the engine clutch so as to continue operation of the power take-off means and will then dismount from the tractor to eliminate clogging of the harvesting mechanism. Considerable thought has been devoted in the past to the provision of safety devices intended to prevent injury to the operator. These devices have taken various forms, among the most important of which are the roll-spreading and the roll-reversing mechanisms. In the first-mentioned device, the snapping rolls are mounted in such manner that one of them may be shifted relative to the other so as to materially widen the crop-receiving space between them. Thus, in the event of clogging, the spreading mechanism can be operated and the excess accumulation of crops will easily pass between the spread-apart rolls. In the case of the reversing mechanism, a secondary transmission is provided in the drive to the snapping rolls so that the direction of rotation of the snapping rolls may be reversed, which will have a tendency to reject the excess accumulation of crops. Although these devices are somewhat effective for the purposes designed, neither is completely satisfactory unless the control thereof is arranged and coordinated in such fashion as to positively eliminate the necessity for the operator to place himself in proximity to the moving parts of the gathering mechanism. For example, roll-spreading mechanism would not be entirely satisfactory if the means for controlling it were located so close to the gathering mechanism as to subject the operator to hazards while operating it. The same thing may be said with respect to the reversing mechanism. One way in which these hazards may be eliminated is by the use of remote control means, whereby the operator may actuate either of the mechanisms from his position on the operator's seat. This has been done in a few cases but the principal defect in a typical arrangement is that the operator is given another control lever to operate, which adds to the number of controls already included at the typical operator's station on a tractor or equivalent vehicle used with harvesting machines.

According to the present invention, the mechanism for modifying the action of the snapping rolls or equivalent harvesting mechanism so as to eliminate an overloaded condition thereof is coordinated with control means already present in the machine, so that the roll-modifying mechanism is operated automatically in response to the operation of control of the vehicle part of the harvesting unit. Specifically, the roll-modifying mechanism is coordinated with the clutch-controlling means of the tractor. Thus, as soon as the operator appreciates that the harvesting mechanism is clogged, he will naturally disengage the tractor clutch, which will automatically modify the action of the harvesting mechanism as by spreading the crop-handling members or by reversing them, for example. In the accomplishment of this object, it should be observed that the principles of the invention will find greater utility in that type of tractor in which the power take-off means is connected to the power source in parallel rather than in series with the tractor transmission. In a tractor of this type, disengagement of the main or engine clutch will not affect the operation of the power take-off means. Thus, the tractor may be stopped by disengagement of its clutch but the snapping rolls will continue to be driven by the power take-off means. Accordingly, the operator may remain on his seat and may handle the entire situation with relative ease and absolute safety.

It is another object of the invention to provide the coordinating means in such manner that it may be readily associated with harvesting machinery of conventional design. It is a further object to provide the coordinating means as an attachment for corn pickers, for example, that are already equipped with a mechanism for modifying the action of the snapping rolls. The invention contemplates and has for a further object the provision of the coordinating means in a corn picker whether it is tractor-mounted or tractor-drawn. It is a further feature of the invention to arrange the coordinating means in such manner that it will not be interfered with by the articulate connection between the harvesting mechanism and tractor or other vehicle on which it is carried.

The foregoing and other important objects and desirable features inherent in and encompassed by the invention will become apparent as preferred embodiments of the invention are disclosed in detail in the following description and accompanying sheets of drawings in which Figure 1 is a side elevational view, with parts broken away, with the near traction wheel removed, of a tractor-mounted corn picker embodying one form of the invention;

Figure 4 is a schematic view illustrating the vehicle power train and the driving connection to the harvesting means or snapping rolls;

Figure 5 is an enlarged fragmentary sectional view as seen substantially along the line 5—5 of Figure 2;

Figure 6 is a fragmentary sectional view showing one form of reversing mechanism that may be used as the modifying mechanism for the harvesting means; and Figure 7 is a side elevational view on a reduced scale showing generally the use of the invention in a tractor-drawn harvester.

Figure 1:
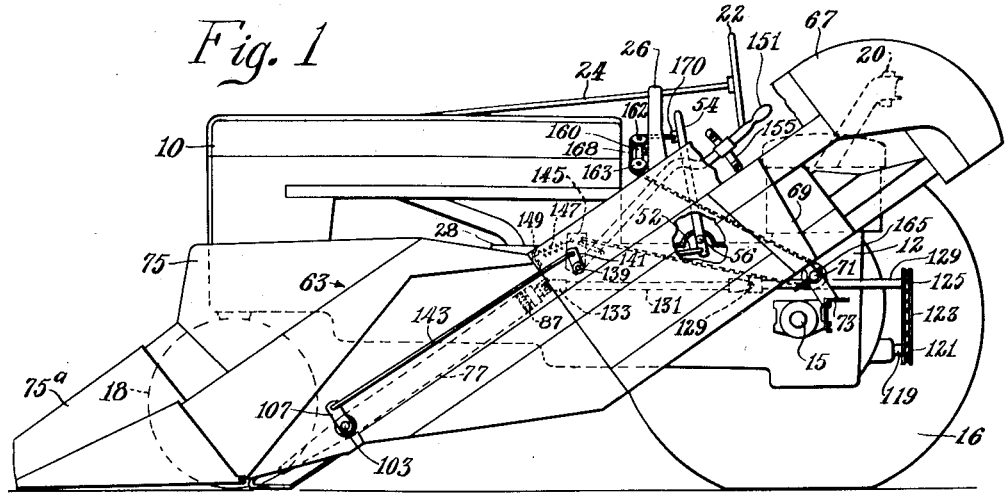

Briefly and generally, the agricultural machine comprises a harvester having mobile frame means including a power source and carried by traction means connected to the power source by a disengageable clutch. The mobile frame means includes a power take-off means driven by the power source independently of the clutch so as to drive crop-handling means including a pair of crop-handling members carried by the frame means and defining a crop-receiving space normally effective to handle received crops but subject to being overloaded by an excess quantity of crops. At least one of the crop-handling members is driven by the power take-off means and the members are arranged relative to each other in such manner that the normal crop-handling effectiveness may be modified by changing the operating relationship of one of the members relative to the other so as to alleviate the overloaded condition. The modifying means is connected by coordinating means to the tractor clutch control or to equivalent means for modifying the rate of travel of the mobile frame means so that the modifying means is operated in response to or in unison with whatever means is utilized to change the rate of travel of the mobile frame means.

In the consideration of the tractor and corn picker as a machine, it is immaterial whether the picker is mounted directly on the tractor or is towed or otherwise propelled thereby. In its broadest sense, the expression "mobile frame means" includes both the vehicle and the harvester. Various other expressions are used in the interests of clarity, since they have generally conventional meaning, but it is to be understood that these expressions are not intended to import any limitation into the appended claims.

The tractor chosen for the purposes of illustration comprises a longitudinal body 10 including a rear transmission or differential case or housing 12 from opposite sides of which respectively project right- and left-hand drive axles 14 and 15. Right- and left-hand traction wheels 16 and 17 provide traction means for carrying the rear end of the tractor. The front end of the tractor is carried on a conventional truck or equivalent rolling support 18. The rear end of the tractor has a conventional operator's station including a seat 20 ahead of which is a steering wheel 22 having a steering shaft 24 supported in any suitable manner as by an upright support 26. The tractors of Figures 1, 2, 4 and 7 may be the same.

The tractor has a power train comprising a power source in the form of an internal combustion engine 28, for example, and suitable drive means, such as a conventional change-speed transmission (not shown in detail), contained in the transmission and differential housing 12, by means of which power may be transmitted to the driving axles 14 and 15. The connection between the power source 28 and the transmission mechanism in the housing 12 includes adjustable means for changing the rate of travel of the tractor. The representative means shown here, which operates as a selectively mobilizable and demobilizable drive means, comprises a combination engine clutch and belt pulley designated generally by the numeral 30 in Figures 2 and 4.

The particular type of tractor shown is similar to that disclosed in the U. S. patent to Witry 1,702,371, wherein the tractor engine is of the two-cylinder type with the cylinders extending longitudinally and the crankshaft having its axis transversely of the tractor. These details are immaterial and in the present case the description will be as brief as possible consistent with an exposition of the general theory of operation.

The internal combustion engine or power source 28 includes, in the present instance, a crankshaft 32 rotatable on an axis transversely of the tractor body 10 and having fixed to the left-hand end thereof a flywheel 33 which rotates in the direction of the arrow A. A belt pulley 34 is keyed to the right-hand end of the crankshaft 32 and the inner radial face of this belt pulley serves as a driving clutch part 36. The numerals 38 and 39 represent piston rods connected to the crankshaft 32.

The combined clutch and belt pulley 30 includes a driven clutch part 40 fixed to a shaft 42 that is loose on the right-hand end of the crankshaft 32. A cooperating driving clutch part 42ª is fixed to a tubular shaft 44 that surrounds the tubular shaft 42 for relative rotation and relative axial shifting. The tubular shaft 44 has a conventional shifting collar 46 with which is engaged one arm of an actuating bell crank 48. This bell crank is rockable on an upright axis at 50 and its other arm is connected by an actuating rod 52 which is connected in turn to the lower end of a control lever or element 54. A representative mounting of the lever 54 is shown in the broken-out portion of Figure 1 as comprising a transverse pivot 56 below which the connection between the lever 54 and the rod 52 is made, so that movement of the upper end of the lever 54 to the right or in a clockwise direction as viewed in Figure 1 causes the rod 52 to move forwardly and to rock the bell crank 48 also in a clockwise direction (as viewed in Figure 4) for separating the clutch parts 36, 40 and 42ª. The disengaged positions of the clutch parts appear in Figure 4. When the clutch control lever 54 is moved forwardly, the clutch will, of course, be engaged to transmit drive from the crankshaft 32 to the tubular shaft 42 via the engaged clutch parts. A driving pinion 58 is keyed to the tubular shaft 42 and is in constant mesh with a driven gear 60 that is in turn keyed to a transmission input shaft 62. The transmission (not shown) contained in the housing 12 may be of any conventional selective-sliding-gear type, such as shown in the Witry patent referred to above. The details thereof are not important here.

Figure 2:
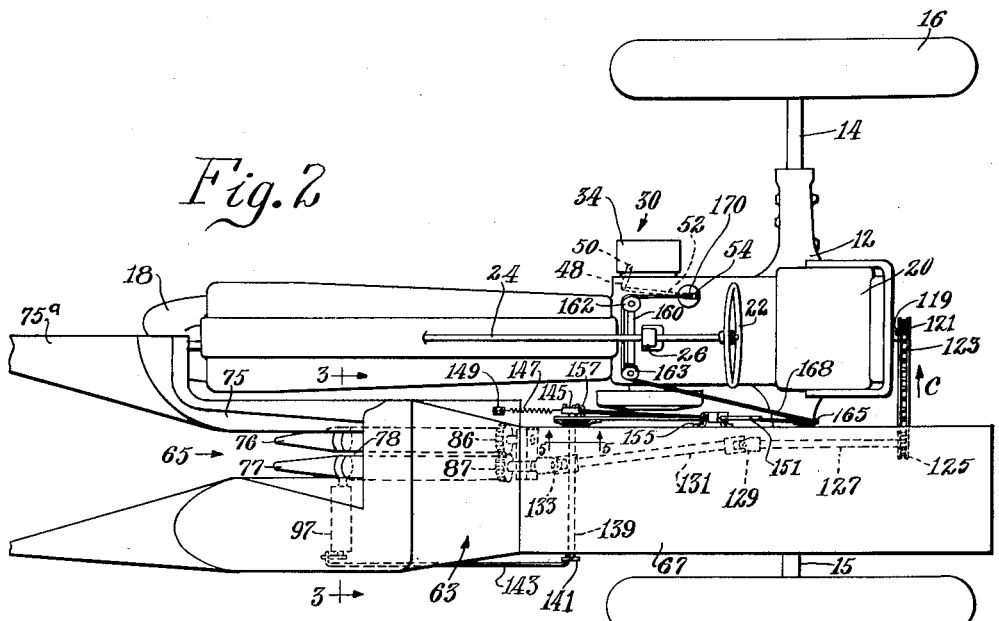
Figure 2 is a plan view of the machine shown in Figure 1.

The harvester selected for illustration with the tractor of Figures 1 and 2 may be considered representative in general of the usual tractor-mounted corn picker. This picker comprises a gathering unit, designated generally by the numeral 63, which defines a longitudinally extending gathering throat 65 (Figure 2) into which standing stalks pass as the machine advances. The gathering unit 63 delivers rearwardly into an upwardly and rearwardly inclined elevator housing 67 which has a depending supporting bracket 69 articulately connected to the tractor on a transverse pivot axis at 71. The pivot is provided by a bracket 73 rigid on a rear left-hand part of the tractor. The gathering unit 63 and elevator housing 67 are preferably integral and the two move as a unit about the pivot axis 71 as the gathering unit encounters varying ground contour. The gathering throat at 65 is further defined by a tractor shield 75 which extends forwardly as a central divider point 75ª and encloses the left-hand part of the front wheel means 18.

The gathering unit 63 comprises crop-handling or crop-receiving means which includes a pair of crop-handling members, here in the form of inner and outer snapping rolls 76 and 77 which between them define a longitudinal crop-receiving space 78.

The gathering unit 63 includes appropriate supporting structure which may include a pair of laterally spaced apart, longitudinally running supporting members 80 and 81 on which the snapping rolls 76 and 77 are respectively supported. A typical form of support for the lower end of the rolls appears in Figures 2 and 3, wherein it is shown that a forward portion of the roll 76 is reduced, as at 82, to provide a bearing for journaling the lower end of the roll in a fixed bracket 84 rigid on the supporting member 80. The upper end of the roll 76 may be supported in any suitable bearing that may likewise be fixed to the supporting member 80, and keyed to the upper end of the roll 76 is a driven pinion 86 in constant mesh with a driving pinion 87 keyed to the upper end of the other roll 77.

The lower end of the roll 77 is reduced to provide a bearing 83 for journaling in a movable bracket 85 suitably carried on the left-hand supporting member 81. The upper end of the roll 77 is preferably fixed relative to the roll 76 so as not to disturb meshing of the pinions 86 and 87. In order that lateral shifting of the lower end of the snapping roll 77 may be accomplished without disturbing the driving relationship between the pinions 86 and 87, the upper end portion of the roll 77 may utilize a flexible coupling such as shown in the U. S. patent to Andrews 2,540,315. Again, the details are not important and only general reference is made to a representative form of design.

The bearing bracket 85 that journals the snapping roll 77 is connected by a vertical pivot pin 89 to a yoke 91 that is in turn welded to a short sliding shaft 93 that extends at right angles to the axis of the snapping roll. This shaft is slidable in a sleeve 95 that is journaled in a tubular bracket 97 rigidly secured to the left-hand snapping roll supporting member 81. Although the sleeve 95 is rotatable in the tubular member 97, it is restrained against axial movement. The short shaft 93 is axially movable but is held against rotation because of its connection at 89 to the snapping roll bracket 85. The sleeve 95 has a pair of spiraling slots 99 (only one of which appears in the drawings) in which run the diametrically opposed ends of a cross pin 101 that passes through the end of the shaft 93. Thus, rotation of the sleeve 95 will cause axial movement of the shaft 93 and will shift the lower end of the snapping roll 77 relative to the lower end of the snapping roll 76. This will cause variations in the width of the crop-receiving space 78 between the rolls.

Actuating means for rocking the sleeve 95 is shown here as including a coaxial rockshaft 103 keyed at its inner end by a pin 105 to the outwardly projecting reduced end of the sleeve 95. The rockshaft 103 is of sufficient length to project at the left-hand side of the gathering unit, at which point it has fixed thereto an actuating arm 107 (Figures 1, 2 and 3).

Figure 3:
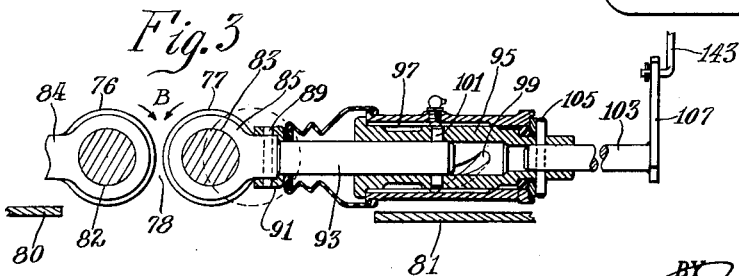
Figure 3 is an enlarged transverse sectional view as seen substantially along the line 3—3 of Figure 2.

During normal operation, the snapping rolls 76 and 77 rotate downwardly and away from each other in the directions of the arrows B in Figure 3. The width of the crop-receiving space 78 is adjusted to accommodate the existing crop conditions. For example, depending upon whether the standing corn is moist or relatively dry, the space at 78 will be varied so that the utmost snapping efficiency may be realized. In a particularly heavy stand of corn, an excess quantity of stalks and ears may be presented to the rolls 76 and 77. This will cause an overloaded condition resulting in clogging or jamming of the rolls. Fundamentally, it is useless to attempt to proceed until the clogged condition is eliminated, since continued advance of the machine will only aggravate the clogged condition. Instead, the arm 107 may be rocked in a clockwise direction (as viewed in Figure 1) to its maximum extent so that the crop-receiving space 78 is made extremely wider, whereupon the clogged condition will be eliminated or alleviated. In short, the normal crop-handling effectiveness of the crop-handling means including the snapping rolls 76 and 77 is positively modified by changing the operating relationship of the roll or member 77 relative to the roll or member 76. The roll-spreading mechanism represents one form of modifying means for accomplishing this purpose. As will be brought out below, other forms of modifying mechanism may be utilized.

In order that the modified action of the harvesting means may be appreciated to its fullest extent, it is preferred that the snapping rolls 76 and 77 be constantly driven; or at least driven by some means that is not interrupted by disengagement of the tractor clutch 30. For this purpose, the particular tractor illustrated is equipped with what is known as a live or continuously running power take-off means. The power take-off means or power take-off shaft shown here is only representative of the many types that could be used and is based primarily on the power take-off shaft design shown in the U. S. patent to McCray 1,957,221. In that patent, as well as here, the fundamental difference of the power take-off arrangement is that the power take-off shaft is connected to the power source in parallel with rather than in series with the input to the transmission. In the drive shown, the left-hand end of the engine crankshaft 32 has keyed thereto a driving pinion 109 which is in constant mesh with a driven gear train comprising an intermediate pinion 111 and a final gear 113. The gear 113 and a driving bevel pinion 115 are commonly keyed to a short shaft 117 and the pinion 115 is in constant mesh with a driven pinion 118. This pinion is keyed to the forward end of a rearwardly extending power take-off shaft 119 to the rear end of which is keyed a driving sprocket 121. A driving chain 123 connects the sprocket 121 and a driven sprocket 125 which is keyed to the rear end of a forwardly extending drive shaft 127. The forward end of this shaft is connected as by a universal joint 129 to a snapping roll input shaft 131 which is in turn connected by a universal joint 133 to the rear end of the snapping roll 77. Since the snapping roll pinions 86 and 87 are in constant mesh, both snapping rolls will be driven in the directions of the arrows B as indicated in Figure 3. The direction of rotation of the power take-off shaft 19 is indicated by the letter C in Figures 2 and 4.

In order that the operator of the machine may control the snapping-roll-modifying means 91—101 from his position on the operator's seat 20, remote control actuating means is provided. The gathering unit 63 may include an appropriate supporting member 135 (Figure 5) having suitable brackets 137 for journaling a transverse rockshaft 139, the left-hand end of which projects to the outside of the elevator housing 67 and has keyed thereto an upstanding arm 141. This arm and the arm 107 on the lower rockshaft 103 are interconnected by an actuating rod 143, so that rocking of the rockshaft 139 transmits force to rock the modifying means rockshaft 103.

The rockshaft 139 is of circular cross section except at its ends, where it is of square cross section to provide a first connection with the outer arm 141 and a second connection with an inner arm 145. Any other suitable arrangement could be used, of course. The inner arm 145 is biased in the direction of the arrow D (Figure 5) by means such as a tension spring 147 anchored to a bracket 149 (Figure 1) secured to any appropriate part of the gathering unit or elevator housing. The purpose of the biasing means is to urge the rockshaft 139 in such direction as to reduce the crop-receiving space 78 to a minimum.

The lower end of a manually operative control lever 151 is fixed to a sleeve 153 that is journaled on the circular-section portion of the rockshaft 139. This lever extends upwardly and rearwardly (Figure 1) and is selectively settable in any one of several positions by means of its cooperative relationship with a notched arcuate sector 155. The lever 151 is associated with the rockshaft 139 by means of a lost-motion connection comprising an L-shaped lug 157 welded to the inner rockshaft arm 145 and having its free end hooked under a lower part of the lever 151, as at 159. Thus, the lever 151 is effective to rock the rockshaft 139 in a clockwise direction as viewed in Figure 5. The biasing spring 147 is effective, of course, to move the arm 145 in the opposite direction. But, if the lever 151 is set at 155, the position of the rockshaft 139 will be maintained against forces tending to move it in a roll-closing direction.

From the description thus far, it will be seen that the lever 151 may be utilized as a remote control means for actuating the actuating means or arm 107 on the rockshaft 103, which in turn actuates the modifying means 91—101 to vary the space 78 between the rolls 76 and 77. Downward movement (or clockwise as viewed in Figure 1) of the lever 151 spreads the rolls 76 and 77 and reverse movement causes the rolls to move together to narrow the space 78, closing movement being of course effected by action of the biasing spring 147 on the rockshaft arm 145.

It was stated above that as a fundamental proposition, advance of the machine while the gathering unit is clogged will not facilitate the elimination of the clogged condition. In a case, as here, in which the tractor has a live power take-off shaft, forward travel of the tractor may be stopped by merely disengaging the main or engine clutch. Since the power take-off shaft is connected to the power source in parallel with the tractor transmission—or ahead of the tractor main clutch—it will continue to run. Thus, the snapping rolls will continue to be rotated and it is much easier to clear the gathering unit. If the tractor is equipped with the conventional power take-off shaft that is driven from the tractor transmission, disengagement of the main or engine clutch will not only stop the tractor but will disconnect the power take-off shaft. Experience has shown that once the moving parts of a harvesting machine such as a corn picker are stopped while attempting to overcome a clogged condition, the condition materially worsens and it is often extremely difficult to clear it. Thus, the live power shaft is an important adjunct to the operation of any kind of agricultural machine in which temporary overloads are experienced. As long as the controls for mechanism of this nature are readily available to the operator, he may remain seated and may compete with clogged conditions or temporary overload without subjecting himself to the hazards that he would experience were he forced to dismount from the tractor and contend with the situation in proximity to moving parts of the machinery.

On the other hand, as stated above, the lever 151 adds to the number of control levers and devices that the operator must manipulate. For example, in the present case, he must disengage the clutch by moving the lever 54 and at the same time must modify the action of the snapping rolls 76 and 77 by moving the lever 151 downwardly. According to the present invention, the two movements are coordinated so that they occur in unison; or, one occurs in response to occurrence of the other. More specifically, the action of the snapping rolls is modified in response to disengagement of the tractor clutch. It will be appreciated, of course, that any other means for modifying or adjusting the power train so as to vary the rate of travel of the mobile frame means could be considered the equivalent of the clutch in the present case.

The support 26 for the steering wheel shaft 24 carries a cross support 160 at opposite ends of which are respectively journaled right- and left-hand guide elements in the form of sheaves 162 and 163. These sheaves form part of guide means which includes a third sheave 165 journaled on the axis of the tractor-picker pivot 71. The pivot 71 may comprise a transverse shaft on which the sheave 165 may be mounted. Any other suitable support may be utilized. Force-transmitting means, here in the form of a cable 168, is connected at one end, as at 170, to an upper portion of the clutch control lever 54 and its other end is connected at 171 to the inner rockshaft arm 145. The cable is, of course, trained about the three sheaves 165, 163 and 162 as shown. Thus, rearward movement of the clutch control lever 54 tensions the cable 168 to cause clockwise rocking of the rockshaft 139 via the rockshaft arm 145, resulting in spreading of the snapping rolls 76 and 77 to increase the width of the crop-receiving space 78. Rearward movement of the clutch control lever 54 also disengages the engine clutch 30. Accordingly, the forward travel of the tractor is stopped and simultaneously the snapping rolls 76 and 77 are spread. Since the rolls are continuously driven by the live power shaft 119, any temporary overload may be easily and simply eliminated by a single control. Stated otherwise, actuation of the snapping-roll-modifying means 91—101 is automatic upon decrease in the rate of forward travel of the tractor.

Figure 6 shows another form of snapping-roll-modifying means that may be used in place of or in conjunction with the snapping-roll-modifying means of Figure 3. If the structure of Figure 6 is used alone, it may be readily tied in with the controls previously described. For the purposes of the following description, it will be assumed that the mechanism of Figure 6 will be used as a substitute for that of Figure 3.

Briefly, Figure 6 shows what may be termed a secondary transmission designated generally by the numeral 172 and comprising a relatively small housing 174 in which is journaled an input shaft 175 capable of being connected by the previously described universal joint 133 to the snapping roll drive shaft 131. The end of the shaft 175 within the casing 174 is journaled or piloted in the hub of a driven gear 176 which has its inner face provided as a driven clutch part 177. The hub of the gear 176 is keyed to the snapping roll shaft of the snapping roll 77. To the extent thus far described, the shaft 175 is rotatable relative to the snapping roll shaft, but the two may be interconnected by means of a shiftable driving clutch part 178 on which is formed a gear 179 and a shifting collar 180. The clutch part 178 is shiftable back and forth on an intermediate splined portion 181 of the shaft 175 by means of a conventional shifter yoke 182 and a rockshaft 183. An actuating arm 184 is keyed to the exposed end of the rockshaft 183 and, considering the secondary transmission as a substitute for the mechanism of Figure 5, the rockshaft 183 takes the place of the rockshaft 139 and the arm 184 is used in lieu of the arm 145 and is connected to the end means 171 of the cable 168. Since the cable will be trained about the sheaves 165, 163 and 162, the rockshaft 183 will be rocked in response to movement of the clutch control lever 54. The return spring 147 is connected to the arm 184 to bias the rockshaft 183 in the direction of the arrow E in Figure 6. This results in causing engagement between the clutch parts 177 and 178 so that the snapping rolls 76 and 77 will be driven in the directions B as shown in Figure 6. It will be recalled, of course, that the direction of rotation of the shaft 131 is the same as that of the live power shaft 119, which, as shown in Figure 4, rotates in the direction of the arrow C. Accordingly, during normal operation of the harvesting mechanism, the snapping rolls will operate in one phase of crop-handling effectiveness to handle normal accumulations of crops.

The secondary transmission 172 also includes means for reversing the direction of rotation of the snapping rolls 76 and 77 under conditions involving excess accumulations of crops. For this purpose, the transmission includes a reverse gear cluster comprising integral gears 185 and 186. The gear 185 is in constant mesh with a reverse gear idler 187 and the gear 186 is in constant mesh with the snapping roll gear 176. But, as long as the shiftable gear and clutch 179—178 is in the position shown in Figure 6, the gear 179 will be out of mesh with the reverse idler gear 187 and the gear cluster 185—186 will merely rotate idly. However, if the arm 184 on the exposed end of the transmission-actuating rockshaft 183 is moved in a direction opposite to that indicated by the arrow E, the clutch 178 will be disengaged from the clutch part 177 of the gear 176, and the gear 179 will engage the reverse idler gear 187. This will reverse the direction of rotation of the gear cluster 185—186 and will result in reversing the direction of rotation of the gear 176, thus causing the snapping rolls 76 and 77 to be reversed. Accordingly, when the snapping rolls become clogged, the secondary transmission 172 will be actuated to reverse the directions of rotation of the snapping rolls so that they will tend to reject the accumulation and thus will clear themselves. The secondary transmission 172 is remotely controlled by means of its coordinating connection with the engine clutch control lever 54.

It will be obvious from the description that the two forms of snapping-roll-modifying means may be used together by merely installing the secondary transmission in the snapping roll drive train and suitably interconnecting the rockshafts 139 and 183. The result will be that in the cases of temporary overload, the snapping rolls may be both reversed in directions of rotation and also spread apart at their lower ends.

Figure 7 represents the tractor of Figure 1 in association with a drawn harvester of the corn-picker type. This harvester comprises a wheeled frame 188 having a gathering unit or crop-receiving means 190 and an upwardly and rearwardly inclining elevator housing 192, which components are respectively similar to those previously described at 63 and 67. The wheeled frame 188 has a forwardly extending draft tongue 194 by means of which an articulate connection is effected at 195 to a drawbar 197 conventionally provided on the tractor. The gathering unit or crop-receiving means 190 will include crop-handling members such as snapping rolls like those previously described at 76 and 77. The numeral 196 in Figure 7 designates the snapping rolls generally. The numeral 198 in Figure 7 is intended to represent generally one or the other of the snapping-roll-modifying means of either Figure 3 or Figure 6; although, as suggested above, the two may be combined. For the present purposes, the installation of either may be assumed. Control of whichever snapping-roll-modifying means is used at 198 may be effected by a cable 200 trained about a guide means or sheave 202 and about the two sheaves 162 and 163 (or equivalent sheaves or guide means) carried on the steering wheel shaft support 26. The location of the sheave 202 in proximity to the articulate connection at 195 between the tractor and draft tongue 194 of the corn picker approximates the function of the location of the sheave 165 on the pivot axis 71 of the machine of Figure 1, so that relative pivotal movement between the tractor and picker as varying ground contour is encountered will not affect the cable 200 between the clutch control lever 54 and the snapping-roll-modifying means 198. It will be observed that the direction of pull on the cable 200 in Figure 7 is opposite to that exerted on the cable 168 of Figure 1, at least as respects the transmission of force to the actuating means of the snapping-roll-modifying means. However, this difference in operation may be readily visualized by assuming that the direction of movement of the actuating member for the snapping-roll-modifying means is such as to give the results of either Figures 3 and 5 or Figure 6. Again, the two forms of snapping-roll-modifying means may be used individually or together.

Power for the snapping rolls and other drivable parts of the drawn picker may be supplied by the tractor power shaft 119 through a power-transmitting arrangement such as shown in U. S. Patent 2,549,999.

Various features of the invention not specifically enumerated will undoubtedly occur to those versed in the art, as likewise will numerous modifications and alterations in the preferred forms of the invention, all of which may be achieved without departing from the spirit and scope of the invention. It will be further understood that the invention may be utilized as an improvement in existing harvesting machinery of the general type disclosed or may be built in as a component part of the combination when the machine is originally manufactured.

What is claimed is:

1. In a harvester having mobile frame means including a power source and carried by traction means connected to the power source by a disengageable clutch, power take-off means driven by the power source independently of the clutch, and crop-handling means including a pair of members carried by the frame means and defining a crop-receiving space normally effective to handle received crops but subject to being overloaded by an excess quantity of crops, at least one of the members being driven by the power take-off means, the improvement comprising: means associated with the crop-handling means and operative to positively modify the normal crop-handling effectiveness thereof by changing the operating relationship of one member to the other so as to alleviate an overloaded condition thereof; and means operatively interconnecting the modifying means and the clutch means for causing the modifying means to alleviate the overloaded condition in response to disengagement of the clutch means.

2. The invention defined in claim 1, in which: the modifying means includes adjustable elements for adjusting one member relative to the other so as to widen the crop-receiving space between the members, whereby the excess crops will pass through such space.

3. The invention defined in claim 1, in which: the modifying means includes direction-changing elements for causing reversal of the direction of movement of at least the driven member so that the excess crops tend to be rejected by the members.

4. In a harvester having mobile frame means including a power source and carried by traction means connected to the power source by a disengageable clutch, power take-off means driven by the power source independently of the clutch, and crop-handling means including a pair of members carried by the frame means and defining a crop-receiving space normally effective to handle received crops but subject to being overloaded by an excess quantity of crops, at least one of the members being connected to and driven by the power take-off means, the improvement comprising: means associated with the crop-handling means and operative to adjust one member relative to the other for varying the width of the crop-receiving space between the members; manual control means connected to the adjusting means for adjusting one member in increments relative to the other, the connection between the manual control means and the adjusting means including lost-motion means providing for extreme widening of the crop-receiving space; and automatic control means interconnecting the adjusting means and the clutch means for causing extreme widening of the crop-receiving space independently of the manual control means in response to disengagement of the clutch means.

5. In a corn harvester including a tractor having a power source connected by a clutch to traction means and a power take-off means connected to the power source independently of the clutch, and a harvester unit connected to the tractor for travel therewith and having a pair of snapping rolls drivingly connected to the power take-off means and normally spaced apart in side-by-side relationship to receive cornstalks therebetween, the improvement comprising: means mounting the snapping rolls on the harvester unit for movement relative to each other for varying the width of the stalk-receiving space therebetween; means on the harvester unit and connected to one of the snapping rolls for spreading the snapping rolls widely apart to materially increase the stalk-receiving space therebetween; and means operatively connected to the roll-spreading means and the tractor clutch for effecting spreading of the snapping rolls in response to disengagement of the tractor clutch, whereby the tractor and harvester unit will be stopped but the spread-apart snapping rolls will continue to be driven by the tractor power take-off means.

6. In a corn harvester having mobile frame means, a power source on the frame means, traction means propelling the frame means, clutch means connecting the power source and traction means, clutch control means selectively actuatable on the frame means between a clutch-engaging position and a clutch-disengaging position to start and stop the traction means, and harvester rolls on the frame means adapted to receive cornstalks therebetween, the improvement comprising: means driving the rolls from the power source independently of the clutch means; means mounting the rolls on the frame means for movement relative to each other to vary the size of the space between the rolls; means on the frame means and connected to one of the rolls for spreading the rolls apart; and means operatively interconnecting the roll-spreading means and the clutch means for spreading the rolls apart in response to actuation of the clutch control means to clutch-disengaging position.

7. In a corn harvester having mobile frame means, selectively mobilizable and demobilizable drive means on the frame means for starting and/or stopping the frame means, control means on the frame means for controlling the drive means, and harvester rolls on the frame in spaced apart relation for receiving cornstalks therebetween, the improvement comprising: means mounting the rolls on the frame means for movement relative to each other to vary the size of the space between the rolls; means on the frame means and connected to one of the rolls for spreading the rolls apart; and means operatively interconnecting the roll-spreading means and the drive means for spreading the rolls apart in response to demobilizing of the drive means.

8. In a harvester having mobile frame means, means on the frame means for mobilizing the frame means, means on the frame means for demobilizing the frame means, and harvesting means for receiving crops and subject to being overloaded by an excess quantity of crops, the improvement comprising: adjustable means arranging the harvesting means on the frame means for adjustment to alleviate an overloaded condition thereof; and means operatively interconnecting the adjustable means and the aforesaid demobilizing means for alleviating an overloaded condition of the harvesting means in response to demobilizing of the frame means.

9. In a harvester including mobile frame means having a power source connected by clutch means to traction means, crop-handling means carried by the frame means and including a pair of members at least one of which is normally rotatable in an ear-snapping phase of operation for accepting a normal quantity of crops but subject to having imposed thereon an excess accumulation of crops, and drive means for interconnecting the rotatable member and the power source independently of the clutch means, the improvement comprising: means associated with the member to cause the member to rotate in a non-crop-receiving phase of operation; actuating means for selectively effecting either phase of operation of the member; and means interconnecting the actuating means and the clutch means for effecting the non-crop-receiving phase of operation in unison with disengagement of the clutch means.

10. In a harvester having mobile frame means including a power source and carried by traction means connected to the power source by clutch means selectively engageable and disengageable by a movable clutch lever on the frame means, power take-off means driven by the power source independently of the clutch means and clutch lever, crop-handling means carried by the frame means and including a pair of crop-handling members defining a crop-receiving space between them, at least one of the members being constantly driven by the power take-off means and the crop-handling effectiveness of at least one of the members being changeable relative to the other in the event that an excess quantity of crops is imposed on the members, and a control element movable on the frame means remote from the clutch lever and connected to and for changing the crop-handling effectiveness of the changeable member, the improvement comprising: guide means having provision thereon for the mounting thereof on the frame means intermediate the clutch lever and the control element; and a force-transmitting connection guided and sustained by the guide means and having opposite end portions respectively including means for operative attachment to the control element and the clutch lever so that movement of the clutch lever in at least one direction transmits force to cause member-changing movement of the control element.

11. In a harvester having mobile frame means including a power source and carried by traction means connected to the power source by clutch means selectively engageable and disengageable by a movable clutch lever on the frame means, power take-off means driven by the power source independently of the clutch means and clutch lever, crop-handling means carried by the frame means and including a pair of crop-handling members defining a crop-receiving space between them, at least one of the members being constantly driven by the power take-off means and at least one of the members being shiftable away from the other to widen the crop-receiving space in the event that an excess quantity of crops is imposed on the members, and a control element movable on the frame means remote from the clutch lever and connected to and for shifting the shiftable member, the improvement comprising: guide means having provision thereon for the mounting thereof on the frame means intermediate the clutch lever and the control element; and a force-transmitting connection guided and sustained by the guide means and having opposite end portions respectively including means for operative attachment to the control element and the clutch lever so that movement of the clutch lever in at least one direction transmits force to cause member-shifting movement of the control element.

12. In a harvester having mobile frame means including a power source and carried by traction means connected to the power source by clutch means selectively engageable and disengageable by a movable clutch lever on the frame means, power take-off means driven by the power source independently of the clutch means and clutch lever, crop-handling means carried by the frame means and including a pair of crop-handling members defining a crop-receiving space between them, at least one of the members being constantly rotated by the power take-off means and being also reversible in its rotation relative to the other in the event that an excess quantity of crops is imposed on the members, and a control element movable on the frame means remote from the clutch lever and connected to the reversible member, the improvement comprising: guide means having provision thereon for the mounting thereof on the frame means intermediate the clutch lever and the control element; and a force-transmitting connection guided and sustained by the guide means and having opposite end portions respectively including means for operative attachment to the control element and the clutch lever so that movement of the clutch lever in at least one direction transmits force to cause member-reversing movement of the control element.

13. In a harvester having mobile frame means including a power source and carried by traction means connected to the power source by clutch means selectively engageable and disengageable by a movable clutch lever on the frame means, power take-off means driven by the power source independently of the clutch means and clutch lever, crop-handling means carried by the frame means for movement about a pivot and including a pair of crop-handling members defining a crop-receiving space between them, at least one of the members being constantly driven by the power take-off means and the action of at least one of the members being changeable relative to the other in the event that an excess quantity of crops is imposed on the members, and a control element movable on the frame means remote from the clutch lever and connected to and for changing the action of the changeable member, and the improvement comprising: guide means having provision thereon for the mounting thereof on the frame means in close proximity to the aforesaid pivot; and a force-transmitting connection guided and sustained by the guide means and having opposite end portions respectively including means for operative attachment to the control element and the clutch lever so that movement of the clutch lever in at least one direction transmits force to cause member-changing movement of the control element.

14. In a harvester having mobile frame means including a power source and carried by traction means connected to the power source by clutch means selectively engageable and disengageable by a movable clutch lever on the frame means, power take-off means driven by the power source independently of the clutch means and clutch lever, crop-handling means carried by the frame means for movement about a pivot and including a pair of crop-handling members defining a crop-receiving space between them, at least one of the members being constantly driven by the power take-off means and at least one of the members being shiftable away from the other to widen the crop-receiving space in the event that an excess quantity of crops is imposed on the members, and a control element movable on the frame means remote from the clutch lever and connected to and for shifting the shiftable member, the improvement comprising: guide means having provision thereon for the mounting thereof on the frame means in close proximity to the aforesaid pivot; and a force-transmitting connection guided and sustained by the guide means and having opposite end portions respectively including means for operative attachment to the control element and the clutch lever so that movement of the clutch lever in at least one direction transmits force to cause member-shifting movement of the control element.

15. In a harvester having mobile frame means including a power source and carried by traction means connected to the power source by clutch means selectively engageable and disengageable by a movable clutch lever on the frame means, power take-off means driven by the power source independently of the clutch means and clutch lever, crop-handling means carried by the frame means for movement about a pivot and including a pair of crop-handling members defining a crop-receiving space between them, at least one of the members being constantly rotated by the power take-off means and being also reversible in its rotation relative to the other in the event that an excess quantity of crops is imposed on the members, and a control element movable on the frame means remote from the clutch lever and connected to the reversible member, the improvement comprising: guide means having provision thereon for the mounting thereof on the frame means in close proximity to the aforesaid pivot; and a force-transmitting connection guided and sustained by the guide means and having opposite end portions respectively including means for operative attachment to the control element and the clutch lever so that movement of the clutch lever in at least one direction transmits force to cause member-reversing movement of the control element.

16. In a harvester having mobile frame means including a power source and carried by traction means connected to the power source by a disengageable clutch, power take-off means driven by the power source independently of the clutch, and crop-handling means including a pair of members carried by the frame means and defining a crop-receiving space normally effective to handle received crops but subject to being overloaded by an excess quantity of crops, at least one of the members being driven by the power take-off means, the improvement comprising: means associated with the crop-handling means and operative to positively modify the normal crop-handling effectiveness thereof by changing the operating relationship of one member to the other so as to alleviate an overloaded condition thereof; actuating means for operating the modifying means; and means operatively interconnecting the actuating means and the clutch means for causing operation of the modifying means and disengagement of the clutch means in unison.

17. In a harvester having mobile frame means including a power train made up of a power source, traction means and an adjustable driving connection between the power source and the traction means for selectively changing the rate of travel of the frame means, crop-handling means connected to the frame means and including a pair of members defining a crop-receiving space normally effective to handle crops in predetermined quantity and at least one of the members being drivable, and power-transmitting means connecting the drivable member to the power train ahead of the adjustable driving connection, the improvement comprising: means associated with the crop-handling means and operative to positively modify the normal crop-handling effectiveness thereof by changing the operating relationship of one member to the other so as to alleviate an overload condition in which crops in excess of the predetermined quantity are presented to the crop-handling means; actuating means for operating the modifying means; and means operatively interconnecting the actuating means and the adjustable driving means for causing operation of the modifying means to alleviate an overload condition in response to such operation of the adjustable driving means as will decrease the rate of travel of the frame means.

References Cited in the file of this patent

UNITED STATES PATENTS

| | | |
|---|---|---|
| 1,160,777 | Small | Nov. 16, 1915 |
| 1,820,570 | Krause | Aug. 25, 1931 |
| 1,836,767 | Niemann et al. | Dec. 15, 1931 |
| 2,152,273 | Otto | Mar. 28, 1939 |
| 2,525,481 | Flora | Oct. 10, 1950 |
| 2,636,330 | Krause | Apr. 28, 1953 |
| 2,645,075 | Karlsson | July 14, 1953 |